United States Patent [19]

Donoghue et al.

[11] Patent Number: 6,004,921
[45] Date of Patent: Dec. 21, 1999

[54] PROCESS FOR MAKING GRANULAR SUDS SUPPRESSING COMPONENT

[75] Inventors: Scott John Donoghue, Ixelles; Carole Patricia Denise Wilkinson, St. Gilles, both of Belgium

[73] Assignee: The Procter & Gamble Company, Cincinnati, Ohio

[21] Appl. No.: 09/066,398

[22] PCT Filed: Oct. 25, 1996

[86] PCT No.: PCT/US96/17127

§ 371 Date: Oct. 2, 1998

§ 102(e) Date: Oct. 2, 1998

[87] PCT Pub. No.: WO97/16519

PCT Pub. Date: May 9, 1997

[30] Foreign Application Priority Data

Nov. 3, 1995 [EP] European Pat. Off. ............ 95202988

[51] Int. Cl.$^6$ ..................................... C11D 11/00
[52] U.S. Cl. .................. 510/444; 510/347; 510/400; 510/466; 510/469; 510/507; 510/513
[58] Field of Search ..................... 510/444, 347, 510/445, 400, 466, 469, 477, 507, 513

[56] References Cited

U.S. PATENT DOCUMENTS

| 4,264,465 | 4/1981 | Abel | 252/99 |
| 4,341,656 | 7/1982 | Abel | 510/347 |
| 4,451,387 | 5/1984 | Tai | 252/174.15 |
| 4,686,060 | 8/1987 | Crabtree et al. | 510/347 |
| 4,732,694 | 3/1988 | Gowland et al. | 252/174.21 |
| 5,238,596 | 8/1993 | Smith | 252/174.15 |

FOREIGN PATENT DOCUMENTS

| 0 636 684 A2 | 2/1995 | European Pat. Off. | C11D 3/12 |
| 0636685 | 2/1995 | European Pat. Off. | |
| 0 718 018 A2 | 6/1996 | European Pat. Off. | B01D 19/04 |
| 2748970B1 | 4/1979 | Germany | C11D 11/00 |
| 2 009 223 | 6/1979 | United Kingdom | C11D 3/37 |

*Primary Examiner*—Lorna M. Douyon
*Attorney, Agent, or Firm*—Jacobus C. Rasser; Kim W. Zerby; Pankaj M. Khosla

[57] ABSTRACT

A process for making a granular suds suppressing component comprises the steps of intimately mixing a liquid or molten suds suppressing component with an emulsifier to form a premix and granulating the premix with a powder. The powder comprises aluminosilicate. The emulsifier is an anionic surfactant. The premix comprises a structuring agent selected from the group consisting of phosphonic and diphosphonic acid, carboxylic and polycarboxylic acid, succinic and disuccinic acid, and salts, and mixtures thereof.

4 Claims, No Drawings

PROCESS FOR MAKING GRANULAR SUDS SUPPRESSING COMPONENT

The invention relates to process for making a granular suds suppressing component, and to certain granular suds suppressing components.

Granular suds suppressing components are used in many applications, including in laundry detergents where it is often desirable to control or reduce the amount of suds generated in automatic washing machines. The formation of a large volume of suds in automatic washing machines is generally to be avoided because it reduces the efficiency of the washing process, and, in extreme cases can result in liquid overflowing the machine.

Many granular suds suppressing components have been proposed in the prior art to control suds.

GB2009223, published on Jun. 13, 1979, discloses granulated silicone/SiO2 suds suppressor wherein the silicone is premixed with nonionic surfactant (TAE25 in Examples 1–3, 5; and TAE14 in Example 4) and granulated on a carrier material such as phosphate, polyphosphate, silicate, aluminosilicate, carbonate sulphate, polycarboxylate or phosphonate.

EP636684, published on Feb. 1, 1995, discloses a foam control agent comprising 1–30% silicone antifoam; 70–99% zeolite; polysiloxane copolymer and 1–40% polycarboxylate binder.

In present day laundry detergents, especially when high levels of sudsing surfactants are being used to give good performance and cleaning efficiency, it is increasingly important to provide more effective suds suppressing components.

It is the object of the present invention to provide a process for making a highly effective granular suds suppressing component comprising the steps of:

(a) intimately mixing a liquid or molten suds suppressing component with an emulsifier to form a premix, and (b) granulating the premix with a powder.

SUMMARY OF THE INVENTION

The object of the invention is achieved by using an anionic surfactant as the emulsifier. Furthermore, it is preferred that the granulating powder comprises aluminosilicate.

In a preferred embodiment of the invention the process further comprises the addition of a structuring agent selected from the group consisting of phosphonic and diphosphonic acid, carboxylic and polycarboxylic acid, succinic and disuccinic acid, and salts, and mixtures thereof. Hydroxyethyldiene diphosphonic acid, and polycarboxylic acid, or salts thereof are the most preferred structuring agents.

In a further aspect of the invention a granular suds suppressor is provided which comprises a silicone oil suds suppressing component and an anionic surfactant. Preferably the granular suds suppressor comprises:

(a) from 1% to 40% by weight of silicone oil;
(b) from 1% to 40% by weight of anionic surfactant;
(c) from 1% to 40% by weight of a structuring agent selected from the group consisting of phosphonic and diphosphonic acid, carboxylic and polycarboxylic acid, succinic and disuccinic acid, and salts, and mixtures thereof; and
(d) from 40% to 97% by weight of sodium aluminosilicate.

Most preferably the ratio of silicone oil to anionic surfactant is from 1:1 to 2:1. The mean particle size of the granular suds suppressing component is at least 450 micrometers.

DETAILED DESCRIPTION OF THE INVENTION

Suds Suppressing Agent

A wide variety of materials may be used as suds suppressing agents such as monocarboxylic fatty acids and their soluble salts, high molecular weight hydrocarbons such as paraffin, fatty acid esters, fatty acid esters of monovalent alcohols, aliphatic C1–C40 ketones, N-alkoxylated amino triazines, propylene oxide, and monstearyl phosphates and phosphate esters. Another preferred category of suds suppressing agents comprises silicone suds suppressors. This category includes the use of polyorganosiloxane oils, such as polydimethyl siloxane, dispersions or emulsions of polyorganosiloxane oils or resins, and combinations of polyorganosiloxane with silica particles wherein the polyorganosiloxane is chemisorbed or fused onto the silica. Preferred polydimethylsiloxanes have trimethylsilyl endblocking units and have a viscosity at 25° C. of from $5 \times 10^{-5}$ m$^2$/s to 0.1 m$^2$/s, corresponding approximately to a degree of polymerisation of from 40 to 1500. Solid silica can be fumed silica, precipitated silica or silica made by gel-formation technique. The silica particles have an average particle size of from 0.1 to 50 micrometers, preferably from 1 to 20 micrometers and a surface area of at least 50 m$^2$/g. These silica particles can be rendered hydrophobic by treating them with dialkylsilyl groups and/or trialkylsilyl groups either bonded directly onto the silica or by means of a silicone resin. It is preferred to employ a silica the particles of which have been rendered hydrophobic with dimethyl and/or trimethyl silyl groups. Silicone antifoams employed in a foam control agent according to the invention suitably have an amount of silica in the range of 1 to 30% (more preferably 2 to 15%) by weight of the total weight or the silicone antifoam resulting in silicone antifoams having an average viscosity in the range of from $2 \times 10^{-4}$ m$^2$/s to 1 m$^2$/s. Preferred silicone antifoams may have a viscosity in the range of from $5 \times 10^{-3}$ m$^2$/s to 0.1 m$^2$/s. Even more preferred are silicone antifoams with a viscosity of $2 \times 10^{-2}$ m$^2$/s to $4.5 \times 10^{-2}$ m$^2$/s.

Silicone suds suppressors are well-known in the art and are, for example, disclosed in U.S. Pat. No. 4,265,779, issued May 5, 1981. Other silicone suds suppressors are disclosed in U.S. Pat. No. 3,455,839 and German Patent Application DE-A 21 24 526.

Anionic Surfactant

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkyl benzene sulfonates in which the alkyl group contains from about 9 to about 15 carbon atoms, in straight or branched chain configuration, e.g., those of the type described in U.S. Pat. Nos. 2,220,099 and 2,477,383. Especially valuable are linear straight chain alkyl benzene sulfonates in which the average number of carbon atoms in the alkyl group is from about 11 to 13, abbreviated as $C_{11}$–$C_{13}$ LAS.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; watersoluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety.

Sarcosinates, such as oleyl sarcosinate may be used in the present invention.

Also considered as anionic surfactants useful in the present invention are hydrotropes such as aryl sulphonates. Preferred are sodium or potassium salts of benzene, toluene, xylene or cumene sulphonate.

Powders

Many powders are suitable for use in the granulation step of the present process. Preferred powders for use in the process and compositions of the present invention are compatible detergency builder or combination of builders or powder.

The detergent compositions herein can contain crystalline aluminosilicate ion exchange material of the formula $$Na_z[(AlO_2)_z\cdot(SiO_2)_y]\cdot xH_2O$$

wherein z and y are at least about 6, the molar ratio of z to y is from about 1.0 to about 0.4 and z is from about 10 to about 264. Amorphous hydrated aluminosilicate materials useful herein have the empirical formula $$M_z(zAlO_2\cdot ySiO_2)$$

wherein M is sodium, potassium, ammonium or substituted ammonium, z is from about 0.5 to about 2 and y is 1, said material having a magnesium ion exchange capacity of at least about 50 milligram equivalents of $CaCO_3$ hardness per gram of anhydrous aluminosilicate. Hydrated sodium Zeolite A with a particle size of from about 1 to 10 microns is preferred.

The aluminosilicate ion exchange builder materials herein are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size diameter of from about 0.2 micron to about 4 microns. The term "particle size diameter" herein represents the average particle size diameter by weight of a given ion exchange material as determined by conventional analytical techniques such as, for example, microscopic determination utilizing a scanning electron microscope. The crystalline aluminosilicate ion exchange materials herein are usually further characterized by their calcium ion exchange capacity, which is at least about 200 mg equivalent of $CaCO_3$ water hardness/g of aluminosilicate, calculated on an anhydrous basis, and which generally is in the range of from about 300 mg eq./g to about 352 mg eq./g. The aluminosilicate ion exchange materials herein are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicate for builder purposes exhibit a calcium ion exchange rate of at least about 4 grains/gallon/minute/gram/gallon.

The amorphous aluminosilicate ion exchange materials usually have a $Mg^{++}$ exchange of at least about 50 mg eq. $CaCO_3$/g (12 mg $Mg^{++}$/g) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Aluminosilicate ion exchange materials useful in the practice of this invention are commercially available. The aluminosilicates useful in this invention can be crystalline or amorphous in structure and can be naturally occurring aluminosilicates or synthetically derived. A method for producing aluminosilicate ion exchange materials is discussed in U.S. Pat. No. 3,985,669, Krummel et al., issued Oct. 12, 1976, incorporated herein by reference. Preferred synthetic crystalline aluminosilicate ion exchange materials useful herein are available under the designations Zeolite A, Zeolite B, Zeolite P, Zeolite MAP and Zeolite X. In an especially preferred embodiment, the crystalline aluminosilicate ion exchange material has the formula $$Na_{12}[(AlO_2)_{12}(SiO2)_{12}]\cdot xH_2O$$

wherein x is from about 20 to about 30, especially about 27 and has a particle size generally less than about 5 microns.

The granular detergents of the present invention can contain neutral or alkaline salts which have a pH in solution of seven or greater, and can be either organic or inorganic in nature. The builder salt assists in providing the desired density and bulk to the detergent granules herein. While some of the salts are inert, many of them also function as detergency builder materials in the laundering solution.

Examples of neutral water-soluble salts include the alkali metal, ammonium or substituted ammonium chlorides, fluorides and sulfates. The alkali metal, and especially sodium, salts of the above are preferred.

Other useful water-soluble salts include the compounds commonly known as detergent builder materials. Builders are generally selected from the various water-soluble, alkali metal, ammonium or substituted ammonium phosphates, polyphosphates, carbonates, borates, silicas and polyhyroxysulfonates. Preferred are the alkali metal, especially sodium, salts of the above.

Specific examples of inorganic phosphate builders are sodium and potassium tripolyphosphate, pyrophosphate, polymeric metaphosphate having a degree of polymerization of from about 6 to 21, and orthophosphate.

Examples of nonphosphorus, inorganic builders are sodium and potassium carbonate, bicarbonate, sesquicarbonate, tetraborate decahydrate.

Structuring agents

Structuring agents which are useful in the present invention are phosphonic and diphosphonic acid, carboxylic and polycarboxylic acid, succinic and disuccinic acid, and salts, and mixtures thereof.

Preferred structuring agents are phosphonic acids such as sodium and potassium salts of ethylene diphosphonic acid, the sodium and potassium salts of ethane 1-hydroxy-1,1-diphosphonic acid and the sodium and potassium salts of ethane, 1,1,2-triphosphonic acid. Particularly preferred are hydroxyethyldiene diphosphonic acid and diethylene triamine penta(methylene phosphonic acid).

Alternative or additional preferred structuring agents are carboxylic acid, such as the water-soluble salts of homo- and copolymers of aliphatic carboxylic acids such as acrylic acid, maleic acid, vinylic acid, itaconic acid, mesaconic acid, fumaric acid, aconitic acid, citraconic acid and methylenemalonic acid. Most preferred is a copolymer of acrylic acid and maleic acid, either in the acidic form, or neutralised. Further polycarboxylates are set forth in U.S. Pat. No. 3,308,067, Diehl, issued Mar. 7, 1967.

Alternative or additional preferred structuring agents are succinic acid, such as ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt thereof. Examples of such preferred sodium salts of EDDS include NaEDDS, $Na_2EDDS$ and $Na_4EDDS$. Examples of such preferred magnesium salts of EDDS include Mg EDDS and $Mg_2EDDS$.

A more disclosure of methods for synthesising EDDS from commercially available starting materials can be found in U.S. Pat. No. 3,158,635, Kezerian and Ramsay, issued Nov. 24, 1964.

The synthesis of EDDS from maleic anhydride and ethylene diamine yields a mixture of three optical isomers, [R,R],[S,S], and [S,R], due to the two asymmetric carbon atoms. The biodegradation of EDDS is optical isomerspecific, with the [S,S] isomer degrading most rapidly and extensively, and for this reason the [S,S] isomer is most preferred for inclusion in the compositions of the invention.

The [S,S] isomer of EDDS can be synthesised from L-aspartic acid and 1,2-dibromoethane, as follows:

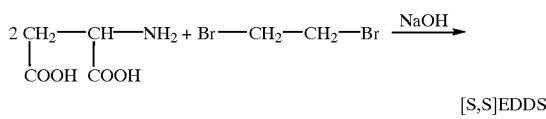

[S,S]EDDS

A more complete disclosure of the reaction of L-aspartic acid with 1,2-dibromoethane to form the [S,S] isomer of EDDS can be found in Neal and Rose, Stereospecific Ligands and Their Complexes of Ethylenediaminediscuccinic Acid, *Inorganic Chemistry*, Vol 7 (1968), pp. 2405–2412.

Alternative or additional preferred structuring agents are citrates and silicates having a molar ratio of $SiO_2$ to alkali metal oxide of from about 0.5 to about 4.0, preferably from about. 1.0 to about 2.4.

Particle Size

The mean particle size of the granular suds suppressing component is from 400 to 800, preferably from 450 to 650 micrometers. In particular, small particles (less than 400 micrometers) are avoided when a polymeric structuring agent such as acrylic-maleic co-polymer is used. In such cases, small particles can lead to gelling upon contact with water which has an adverse effect on suds control. This may occur both with or without the anionic surfactant emulsifier. Large particles can result in segregation, and are therefore also preferably avoided.

Process for Making Suds Suppressing Component

Many granulation processes exist which can be used to prepare the granular suds suppressing components of the present invention. The choice of granulation process will largely be determined by the exact nature of the components to be granulated.

In the preferred embodiment of the invention, suds suppressing components based upon silicone oils may be conveniently granulated by the following process. Firstly the silicone suds supressor is premixed with anionic surfactant at a temperature of 50 to 80° C. The anionic surfactant may be used as an aqueous solution or as a viscous paste, or as a powder. The premix is then further mixed with the structuring agent which is preferably an aqueous solution. The resulting mixture is finally mixed with a powder which causes granules to be formed. A high shear mixer is particularly suitable for this granulation step such as a food processor on laboratory scale, or a Schugi® or Loedige® mixer on a pilot plant or industrial scale. The particles are then dried in a fluid bed dryer at a temperature of 25° C. with dry air.

In an alternative embodiment, the silicone suds suppressing component is premixed with the aqueous solution of structuring agent. The anionic surfactant, in powder form, is premixed with the detergent powder (e.g. crystalline aluminosilicate). The structured aqueous silicone premix, and the powder premix are then granulated in a high shear mixer as described above.

The resulting particle is crisp and free-flowing.

EXAMPLES

Granular suds suppressors having the compositions of Examples 1 to 10 were made by the following process. A small lab scale food mixer was used to mix the silicone/silica antifoam compound, which was is heated to 60° C., with the surfactant. This was followed by the addition or the structuring agent. This liquid mixture was then intimately mixed with zeolite in the food mixer at full speed for a period of 2–3 minutes. Additional water was added separately to complete the particle formation. The particles were then dried in a fluid bed for 20–30 minutes using pressurised dry air at 4 bar and 25° C. to form the finished free flowing particle.

|  | Ex. 1 | Ex. 2 | Ex. 3 | Ex. 4 | Ex. 5 |
|---|---|---|---|---|---|
| Silicone oil/silica | 9.9 | 10.4 | 8.6 | 10.2 | 9.4 |
| Anionic surfactant | 13.2 | 15.5 | 32 | 16.9 | 12.5 |
| Zeolite A | 59.3 | 62 | 51.2 | 61 | 56.3 |
| Hydroxyethyldiene diphosphonic acid (28% active soln.) | 5.9 | 6.2 | 5.1 | 6.1 | 5.6 |
| Added water | 11.7 | 5.9 | 3.1 | 5.8 | 16.2 |

The anionic surfactants used in Examples 1 to 5 were:
90% active powder of alkyl sulphate in Example 1;
78% active Alkyl Sulphate/Alkyl ethoxylated sulphate paste in Example 2;
32% active aqueous paste of tallow alkyl sulphate in Example 3;
72% active aqueous paste of alkyl sulphate in Example 4;
90% active powder of secondary alkyl sulphate in Example 5

|  | Ex. 6 | Ex. 7 | Ex. 8 | Ex. 9 | Ex. 10 |
|---|---|---|---|---|---|
| Silicone oil/silica | 10.3 | 10.9 | 11 | 10.6 | 11 |
| Linear alkyl benzene sulphonate (78% paste) | 15.9 | 16.8 | 17 | 16.6 | 17 |
| Zeolite A | 63.5 | 62 | 62.1 | 62.8 | 62.1 |
| Structuring agent | 6.3 | 6.6 | 6.5 | 7.6 | 6.5 |
| Added water | 3.7 | 3.7 | 3.4 | 2.4 | 3.4 |

The structuring agents used in Examples 6 to 10 were:
28% active soln of hydroxyethyldiene diphosphonic acid in Example 6;

28% Sodium salt of Diethylene Triamine Penta(Methylene Phosphonic Acid), 6% acrylic-maleic co-polymer, 6% magnesium sulphate and 60% water in Example 7;

40% active solution of sodium citrate in Example 8;

15% Sodium salt of S,S Ethylenediamine N,N Disuccinic Acid,

15% magnesium sulphate and 60% water in Example 9;

30% active solution of Sodium salt of S,S Ethylenediamine N,N Disuccinic Acid in Example 10.

What is claimed is:

1. A process for making a granular suds suppressing component, comprising the steps of:
   (a) intimately mixing a liquid or molten suds suppressing component with an emulsifier, for form a premix; and
   (b) granulating the premix with a powder, said powder comprising aluminosilicate;
   wherein said emulsifier is an anionic surfactant; and
   wherein said premix further comprises a structuring agent selected from the group consisting of phosphonic and diphosphonic acid, and salts, and mixtures thereof.

2. A process according to claim 1 wherein the structuring agent is hydroxyethyldiene diphosphonic acid, or salts thereof.

3. A process according to claim 1 wherein the mean particle size of the granular suds suppressing component is at least 450 micrometers.

4. A process according to claim 1, wherein said suds suppressing component comprises silicone oil.

* * * * *